(12) United States Patent
Zhang

(10) Patent No.: US 11,393,154 B2
(45) Date of Patent: Jul. 19, 2022

(54) HAIR RENDERING METHOD, DEVICE, ELECTRONIC APPARATUS, AND STORAGE MEDIUM

(71) Applicant: BEIJING DAJIA INTERNET INFORMATION TECHNOLOGY CO., LTD., Beijing (CN)

(72) Inventor: Xuesong Zhang, Beijing (CN)

(73) Assignee: BEIJING DAJIA INTERNET INFORMATION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/257,285

(22) PCT Filed: Dec. 20, 2019

(86) PCT No.: PCT/CN2019/127225
§ 371 (c)(1),
(2) Date: Dec. 30, 2020

(87) PCT Pub. No.: WO2020/125785
PCT Pub. Date: Jun. 25, 2020

(65) Prior Publication Data
US 2021/0312695 A1 Oct. 7, 2021

(30) Foreign Application Priority Data
Dec. 21, 2018 (CN) .......................... 201811573130.9

(51) Int. Cl.
*G06T 15/04* (2011.01)
*G06T 15/50* (2011.01)

(52) U.S. Cl.
CPC ............ *G06T 15/04* (2013.01); *G06T 15/506* (2013.01)

(58) Field of Classification Search
None
See application file for complete search history.

(56) References Cited

U.S. PATENT DOCUMENTS 7,450,122 B2 * 11/2008 Petrovic ................. G06T 13/40
345/426
9,565,410 B2   2/2017 Huai
2018/0005428 A1 * 1/2018 Montero ................ G06T 15/04

FOREIGN PATENT DOCUMENTS

CN    104376597 A    2/2015
CN    107256304 A    10/2017
(Continued)

OTHER PUBLICATIONS

Gang, Yang et al., "GPU-Based Realistic Fur Rendering," Journal of Software, 2006, 17(3): 577-586.
(Continued)

*Primary Examiner* — Tize Ma
(74) *Attorney, Agent, or Firm* — Foley & Lardner LLP

(57) ABSTRACT

A hair rendering method, a device, an electronic apparatus, and a storage medium, pertaining to the technical field of computer graphics. The method comprises: acquiring multiple initial sections used as cross sections for simulating hair growth (201); determining hair distribution points on each of the multiple initial sections according to a rule of successively decreasing hair distribution densities, and obtaining multiple hair sections (202); sequentially rendering, by means of a pre-determined illumination model, the multiple hair sections on a three-dimensional model requiring hair rendering, and obtaining a target three-dimensional model, the pre-determined illumination model being used to simulate a hair illumination effect (203).

15 Claims, 6 Drawing Sheets

(56) References Cited

FOREIGN PATENT DOCUMENTS

| CN | 107393017 A | 11/2017 |
| CN | 107784134 A | 3/2018 |
| CN | 108399651 A | 8/2018 |
| CN | 108510500 A | 9/2018 |
| CN | 108629834 A | 10/2018 |
| CN | 108961373 A | 12/2018 |
| CN | 109035381 A | 12/2018 |
| CN | 109685876 A | 4/2019 |
| JP | 2002-032777 A | 1/2002 |

OTHER PUBLICATIONS

International Search Report dated Mar. 20, 2020, from application No. PCT/CN2019/127225.
Kun, Xu et al., "Interactive Hair Rendering and Appearance Editing under Environment Lighting," Journal of Computer-Aided Design & Computer Graphics, vol. 24, No. 2, Feb. 2012.
Notification to Grant Patent Right for Invention dated Sep. 30, 2020, from Chinese application No. 201811573130.9.
Chinese Office Action dated May 25, 2020, from application No. 201811573130.9.
Yanfang, Cao, "Study of the Key Technology of Hair Modeling," Mar. 2009, 57 Pages.

\* cited by examiner

HAIR RENDERING METHOD, DEVICE, ELECTRONIC APPARATUS, AND STORAGE MEDIUM

CROSS REFERENCES TO RELATED APPLICATIONS

The present application is a national phase application under 35 U.S.C. 371 of International Patent Application No. PCT/CN2019/127225, filed Dec. 20, 2019, which claims the priority to the Chinese Patent Application No. 201811573130.9, filed with the Chinese Patent Office on Dec. 21, 2018, and entitled "HAIR RENDERING METHOD, APPARATUS, ELECTRONIC DEVICE, AND STORAGE MEDIUM", which is hereby incorporated by reference in its entirety.

TECHNICAL FIELD

The application relates to the field of computer graphics technologies, in particular to a hair rendering method, an apparatus, an electronic device, and storage medium.

BACKGROUND

With rapid development of computer graphics technologies, virtual objects are increasingly used in production of movies, games and animations. In order to realize realism of the virtual objects, some key technologies are required, such as skeletal animation, facial expressions, hair simulation and the like. The hair simulation has always been a very challenging and important issue in the field of graphics. Hair rendering refers to drawing hair for the virtual objects to realize the hair simulation, which plays an important role in enhancing the realism of the virtual objects.

In the related art, there is provided a hair rendering method, including: for a three-dimensional model of hairs to be drawn, performing refined geometric modeling for each hair of the three-dimensional model to obtain a geometric model of each hair, and then performing rendering for each hair according to the geometric model of each hair and a preset illumination model, respectively, in order to obtain a three-dimensional model of the drawn hairs. The preset illumination model is configured to simulate an illumination effect for the hair, that is, to determine a color value of a point on a surface of the object under an illumination environment.

SUMMARY

The application provides a hair rendering method, an apparatus, an electronic device, and storage medium.

According to a first aspect of implementations of the application, there is provided a hair rendering method. The method includes acquiring a plurality of initial sections, wherein the plurality of initial sections are used for simulating cross sections of hair growth. The method includes determining hair distribution points on each of the plurality of initial sections according to a rule of successively decreasing hair distribution densities, and obtaining a plurality of hair sections. The method includes sequentially rendering, by means of a preset illumination model, the plurality of hair sections on a three-dimensional model to be drawn with hairs, and obtaining a target three-dimensional model. The preset illumination model is configured to simulate a hair illumination effect.

According to a second aspect of the implementations of the application, there is provided a hair rendering apparatus. The apparatus includes an acquiring module, configured to acquire a plurality of initial sections. The plurality of initial sections are used for simulating cross sections of hair growth. The apparatus includes a determining module, configured to determine hair distribution points on each of the plurality of initial sections according to a rule of successively decreasing hair distribution densities, and obtain a plurality of hair sections. The apparatus includes a rendering module, configured to sequentially render, by means of a preset illumination model, the plurality of hair sections on a three-dimensional model to be drawn with hairs, and obtain a target three-dimensional model, wherein the preset illumination model is configured to simulate a hair illumination effect.

According to a third aspect of the implementations of the application, there is provided an electronic device. The device includes a memory for storing computer programs, candidate intermediate data and result data generated by executing the computer programs. The device includes a processor, configured to acquire a plurality of initial sections. The plurality of initial sections are used for simulating cross sections of hair growth. The processor is further configured to determine hair distribution points on each of the plurality of initial sections according to a rule of successively decreasing hair distribution densities, and obtain a plurality of hair sections, and sequentially render, by means of a preset illumination model, the plurality of hair sections on a three-dimensional model to be drawn with hairs, and obtain a target three-dimensional model. The preset illumination model is configured to simulate a hair illumination effect.

According to a fourth aspect of the implementations of the application, there is provided a non-transitory computer-readable storage medium. Instructions in the storage medium, when executed by a processor of a computer, cause the computer to execute any of the hair rendering methods provided by the implementations of the application.

According to a fifth aspect of the implementations of the application, there is provided a computer program product, which when running on a computer, causes the computer to execute a hair rendering method. The method includes acquiring a plurality of initial sections. The plurality of initial sections are used for simulating cross sections of hair growth. The method includes determining hair distribution points on each of the plurality of initial sections according to a rule of successively decreasing hair distribution densities, and obtaining a plurality of hair sections. The device includes sequentially rendering, by means of a preset illumination model, the plurality of hair sections on a three-dimensional model to be drawn with hairs, and obtaining a target three-dimensional model. The preset illumination model is configured to simulate a hair illumination effect.

BRIEF DESCRIPTION OF THE DRAWINGS

The accompanying drawings, which are incorporated in the specification and constitute a part of the specification, show example implementations of the application. The drawings along with the specification explain the principles of the application.

DETAILED DESCRIPTION

Figure 1:
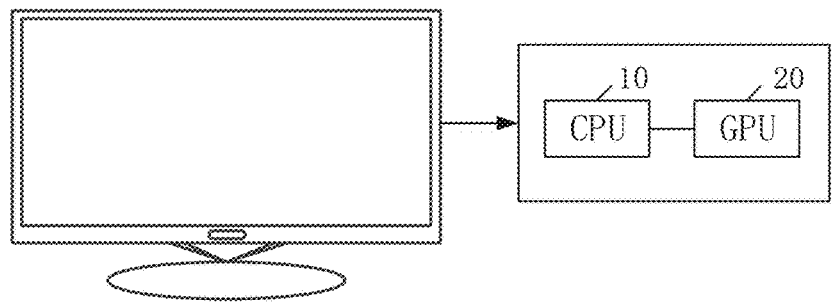
FIG. 1 is a schematic diagram of an electronic device provided by an implementation of the application.

Example implementations will be described in detail herein, examples of which are illustrated in the accompanying drawings. The same numeral in different figures refers to the same or similar elements unless otherwise indicated. The implementations described in the following example implementations do not represent all implementations consistent with the application. Instead, they are merely examples of devices and methods consistent with aspects of the application as detailed in the appended claims.

Before the implementations of the application are described in detail, application scenarios of the implementations of the application will be described first.

Applicant realizes that, conventionally, the geometric model of each hair needs to be constructed finely, and each hair needs to be rendered separately. As a result, hair rendering efficiency is low, and a requirement for a rendering device is relatively high.

The hair rendering method provided by the implementations of the application can be applied to computer graphics processing scenarios such as movies, animations, games, VR (Virtual Reality) or AR (Augmented Reality), and is applied to a scenario in which the hair of an virtual object is drawn to simulate the hair of the virtual object, which can increase realism of the virtual object. The virtual object is usually a human, an animal, a bionic creature or the like.

For example, in an animation production scenario, after a three-dimensional model of an animal is drawn, the hair of the three-dimensional model can be drawn by the hair rendering method provided by the implementations of the application to simulate the hair of the animal.

For a user, low latency and high efficiency when an electronic device performs the hair rendering are necessary conditions for ensuring good user experience. For example, if a scheme in which each hair is geometrically modeled, and then each hair is rendered separately is adopted, since every creature basically has thousands of hairs, thousands of modeling and rendering operations are also required, leading to complicated operations, which seriously affects the rendering efficiency of the electronic device, resulting in relatively poor user experience, and hardware performance requirements for the electronic device are also high. In contrast, the implementations of the application can provide a simple and efficient hair rendering method, which has low hardware performance requirements for the electronic device, can be applied to the electronic device with low hardware performance, and can meet real-time rendering requirements of the electronic device.

Next, an implementation environment of the implementations of the application will be introduced.

The hair rendering method provided by the implementations of the application is applied to an electronic device with an image processing function. The electronic device can be a mobile phone, a tablet computer, a portable computer, a desktop computer or a wearable device, etc., or a VR or AR device integrated with an image processing function.

FIG. 1 is a schematic diagram of an electronic device provided by an implementation of the application. As shown in FIG. 1, the electronic device includes a CPU (Central Processing Unit) 10 and a GPU (Graphics Processing Unit) 20. The CPU 10 is configured to perform pre-processing before rendering, for example, generate hair distribution maps of a plurality of hair sections; the GPU is configured to perform image rendering. For example, the GPU can sequentially render the plurality of hair sections by an illumination model based on a hair distribution position of each hair section.

Next, the hair rendering method provided by the implementations of the application will be introduced in detail.

Figure 2:
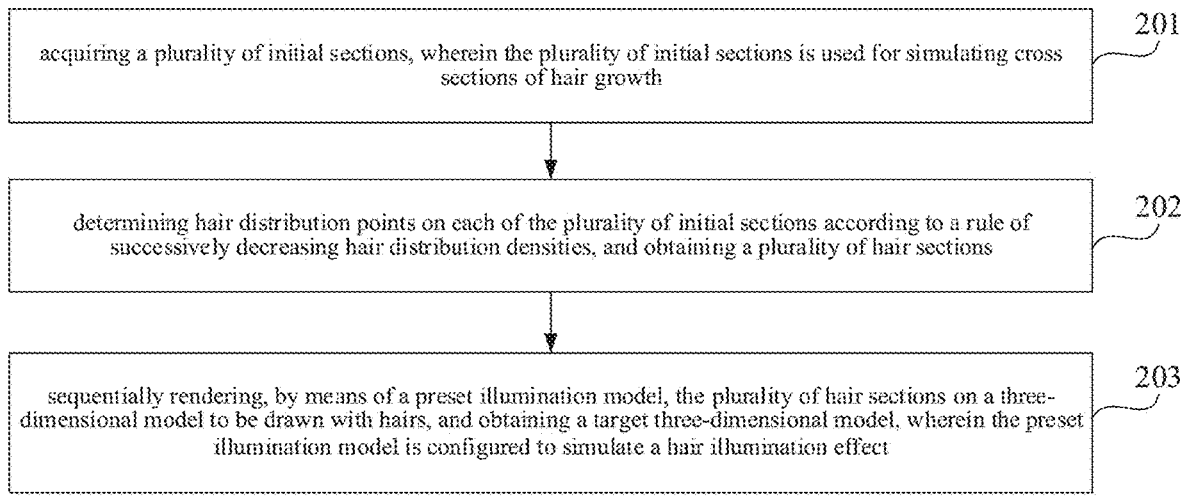
FIG. 2 is a flowchart of a hair rendering method provided by an implementation of the application.

FIG. 2 is a flowchart of a hair rendering method provided by an implementation of the application. The method is applied to an electronic device with the image processing function. As shown in FIG. 2, the method includes the following steps.

In step 201, a plurality of initial sections are acquired, and the plurality of initial sections are used for simulating cross sections of hair growth.

That is, before a three-dimensional model to be drawn with the hair is rendered, the plurality of initial sections can be first constructed to simulate individual cross sections of the hair growth.

The plurality of initial sections are arranged in sequence according to a hair growth direction, that is, in a direction from a hair root to a hair tip, and are used for simulating the cross sections of the hair perpendicular to the hair growth direction. That is, a first initial section is used for simulating a cross section at the hair root position, and the last initial section is used for simulating a cross section at the hair tip position.

It should be noted that the specific number of the plurality of initial sections can be preset by a technician, can be set by the user, or can be determined according to hair rendering accuracy of the three-dimensional model to be drawn with the hair, which is not limited in the implementations of the application. For example, the number of the plurality of initial sections may be 3, 5, 9, or 10, etc., and the implementations of the application will not give examples one by one. For example, assuming that the number of the plurality of initial sections is 9, then nine initial sections arranged in the hair growth direction can be acquired.

In addition, a distance between two adjacent initial sections in the plurality of initial sections may be equal or unequal. For example, one initial section can be constructed every equal interval. Alternatively, distances between the plurality of initial sections can also be decreased or increased sequentially.

In step 202, hair distribution points are determined on each of the plurality of initial sections according to a rule of successively decreasing hair distribution densities, and a plurality of hair sections are obtained.

In other words, certain positions can be selected as the hair distribution points on each initial section to simulate a hair distribution, and each initial section is converted into the hair section with the hair distribution points. The hair distribution points of each hair section can indicate which positions on each hair section have hairs and which positions have no hairs, and can indicate the hair distribution density.

In the implementations of the application, by determining the plurality of hair sections according to the rule of successively decreasing hair distribution densities, the hair distribution densities and opacity of the plurality of hair sections can be gradually decreased from the inside to the outside, which can simulate a real hair growth effect in which the hair roots are dense with low transmittance, and the hair tips are sparse with high transmittance.

In some implementations, the operation of determining hair distribution points on each of the plurality of initial sections according to a rule of successively decreasing hair distribution densities includes: sampling pixel points in a first initial section according to a first hair distribution density to obtain a plurality of first sampling points, and marking the plurality of first sampling points as the hair distribution points to obtain a hair section corresponding to the first initial section; and sampling hair distribution points on a previous hair section of a second initial section according to a second hair distribution density to obtain a plurality of second sampling points, and marking the hair distribution points on the second initial section according to the plurality of second sampling points to obtain a hair section corresponding to the second initial section.

The first initial section is a first initial section in the plurality of initial sections, the second initial section is any initial section behind the first initial section, and the second hair distribution density is less than a hair distribution density of the previous hair section. In addition, the first hair distribution density can be preset by the technician, can be set by the user, or can be determined according to the hair rendering accuracy of the three-dimensional model to be drawn with the hair, which is not limited in the implementation of the application. The previous hair section of the second initial section refers to a hair section corresponding to a previous initial section of the second initial section.

That is, for the first initial section, the pixel points in the first initial section can be sampled, and the sampling points are used as the hair distribution points of the corresponding hair section. For any initial section behind the first initial section, the hair distribution points of the previous hair section of this initial section are sampled, the hair distribution points of the corresponding hair section are determined according to the sampling points, and it is ensured that a hair distribution density of the corresponding hair section is smaller than that of the previous hair section.

A sampling method for sampling the pixel points in the first initial section, and a sampling method for sampling the hair distribution points in the previous hair section of the second initial section may be random sampling or Poisson sampling. By performing Poisson sampling on the pixel points in the first initial section, it can be ensured that the hair distribution points of the corresponding hair section meet the Poisson distribution. Because the Poisson distribution is suitable for describing the number of random events occurring in unit space, it can more realistically simulate the hair distribution points in the corresponding hair section.

The sampling points can be marked by using a manner such as color marking or position marking. For example, the sampling points are marked with specific colors to distinguish them from other points.

In a possible implementation, Poisson sampling may be performed on the pixel points in the first initial section, and the hair distribution points in the previous hair section of the second initial section may be randomly sampled.

In some implementations, the operation of marking the hair distribution points on the second initial section according to the plurality of second sampling points includes the following two implementations.

In a first implementation, mapping points of the plurality of second sampling points on the second initial section are marked as the hair distribution points.

That is, the second sampling point may be mapped on the second initial section to mark the points located at the same positions as the plurality of second sampling points on the second initial section as the hair distribution points.

In a second implementation, position shift is performed on the plurality of second sampling points according to a preset shift rule, and mapping points of the plurality of shifted second sampling points on the second initial section are marked as the hair distribution points.

In this implementation, by applying the shift to the hair distribution points on the second hair section, a posture and swing of the hair can be simulated, for example, the swing of the hair with the wind can be realistically simulated.

The preset shift rule can be set in advance, or can be set according to actual needs. In some implementations, the preset shift rule may include a shift direction and a shift amount, so that the hair distribution points of the second hair section are shifted according to the shift direction and the shift amount relative to the hair distribution points at the same positions on the previous hair section.

In step 203, the plurality of hair sections are sequentially rendered on a three-dimensional model to be drawn with hairs by means of a preset illumination model, and a target three-dimensional model is obtained. The preset illumination model is configured to simulate a hair illumination effect.

The three-dimensional model to be drawn is a three-dimensional model of the virtual object. The virtual object can be a virtual image such as a human, an animal, or a bionic creature. The bionic creature can be a robot, a doll, or other self-created creatures. For example, the three-dimensional model may be a three-dimensional model of a virtual character in a movie, such as a werewolf or a gorilla. The target three-dimensional model is the three-dimensional model with the drawn hair.

The illumination model is also referred to as a shading model, which is configured to calculate the illumination intensity (color value) at a certain point of the object. The preset illumination model is configured to calculate color values of the hair distribution points on each hair section in an illumination environment according to a specific illumination algorithm, and then the illumination effect of the hair in a real illumination environment can be simulated, improving the realism of the hair.

The preset illumination model can be set in advance. For example, the preset illumination model can be a Lambert illumination model (diffuse reflection model), a Phong illumination model (specular reflection model), a Blinn-Phong illumination model (modified specular reflection model), a Rendering Equation illumination model (global illumination model), a Kajiya illumination model (anisotropic reflection model) or a Kajiya-Kay illumination model (classic hair illumination model).

The Kajiya illumination model and the Kajiya-Kay illumination model are models derived based on electromagnetic wave theory, reflecting the reflection and refraction of anisotropic surfaces, and can more realistically simulate the hair illumination effect.

In some implementations, the operation of sequentially rendering, by means of a preset illumination model, the plurality of hair sections on a three-dimensional model to be drawn with hairs includes: extending each hair section along a hair growth direction based on hair distribution points on each hair section, and obtaining a geometric model of each hair section; and sequentially rendering, by means of the preset illumination model, geometric models of the plurality of hair sections on the three-dimensional model.

That is, the geometric model of each hair section can be constructed first, and then the hairs on each hair section are uniformly rendered in conjunction with the geometric model of each hair section and the preset illumination model. In this way, the rendering of one hair section or a plurality of hair sections can be completed at a time, and the rendering efficiency is high.

In some implementations, based on the hair distribution points of each hair section, when each hair section is extended along the hair growth direction, the hair distribution points of each hair section can be extended along the hair growth direction to obtain the geometric model of each hair section. Alternatively, each hair section can be extended along the hair growth direction according to the mark positions of the hair distribution points on each hair section, so that the hair distribution points can be extended, or the non-hair distribution points can be extended, and the extension of hair distribution points has obvious marks, which can be distinguished from the non-hair distribution points.

Sequentially rendering, by means of the preset illumination model, the geometric models of the plurality of hair sections means that the illumination calculation is performed on the hair distribution points of each hair section by the preset illumination model to obtain the color value of each hair distribution point in the illumination environment, and each hair section is colored according to the obtained color values.

It should be noted that the operation of constructing the geometric model of each hair section in the above step 201, step 202, and step 203 can be executed by the CPU of the electronic device, and the operation of sequentially rendering, by means of a preset illumination model, the geometric models of the plurality of hair sections in the step 203 may be performed by the GPU of the electronic device. For example, after the geometric model of each hair section is obtained by the pre-processing performed by CPU, the geometric model of each hair section can be sent to the GPU, and the GPU may sequentially render the geometric models of the plurality of hair sections by the preset illumination model.

In the implementations, the operation of sequentially rendering, by means of the preset illumination model, the plurality of hair sections on the three-dimensional model to be drawn with the hair includes the following two implementations.

In a first implementation, a rendering interface is called, and the geometric models of the plurality of hair sections are sequentially superimposed on an outer surface of the three-dimensional model by the rendering interface; and a first color value of each pixel point in the geometric model of each hair section is determined by the preset illumination model, and the geometric model of each hair section is colored according to the determined first color value, during sequentially superimposing the geometric model of each hair section.

The rendering interface is an interface used for drawing a three-dimensional scene. For example, the rendering interface is OpenGL (Open Graphics Library). The OpenGL is a cross-language and cross-platform application programming interface used for rendering 2D and 3D vector graphics, configured to draw complex three-dimensional scenes from simple graphics bits.

In the first implementation, the rendering interface can be called to sequentially render the geometric models of the plurality of hair sections, that is, the plurality of hair sections are sequentially mapped on the outer surface of the three-dimensional model. Moreover, during sequentially superimposing the geometric models of the plurality of hair sections, each time one hair section is superimposed; the illumination calculation and the coloring are performed on the geometric model of this hair section by the preset illumination model. That is, the superimposition of the hair sections and the illumination treatment can be performed at the same time.

In addition, during rendering the geometric models of the plurality of hair sections, after the rendering of one hair section is completed, a rendering result can also be blended with a rendering result of the previous hair section to make the opacity of the plurality of hair sections decrease sequentially.

Figure 3:
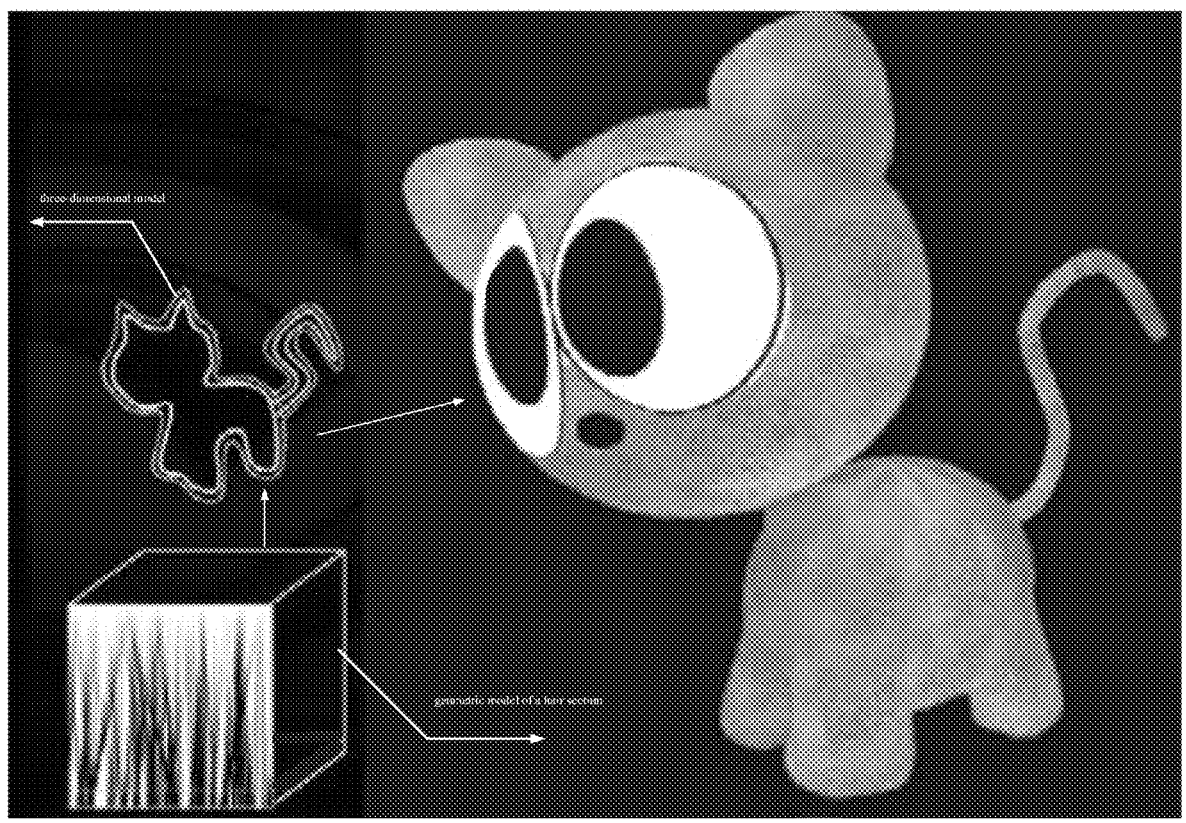
FIG. 3 is a schematic diagram of hair rendering of a three-dimensional model provided by an implementation of the application.
Figure 4:
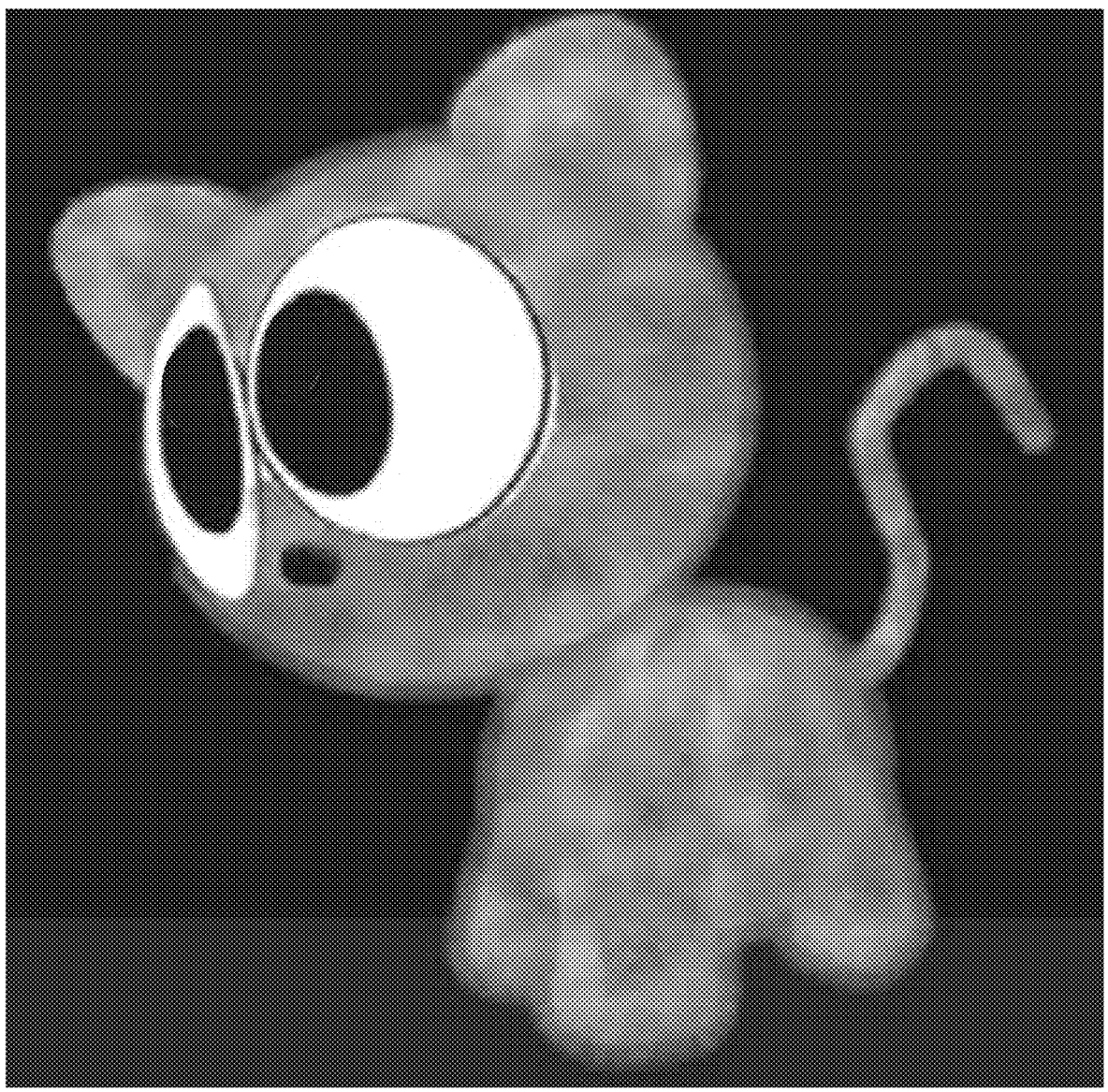
FIG. 4 is a schematic diagram of hair rendering of another three-dimensional model provided by an implementation of the application.
Figure 5:
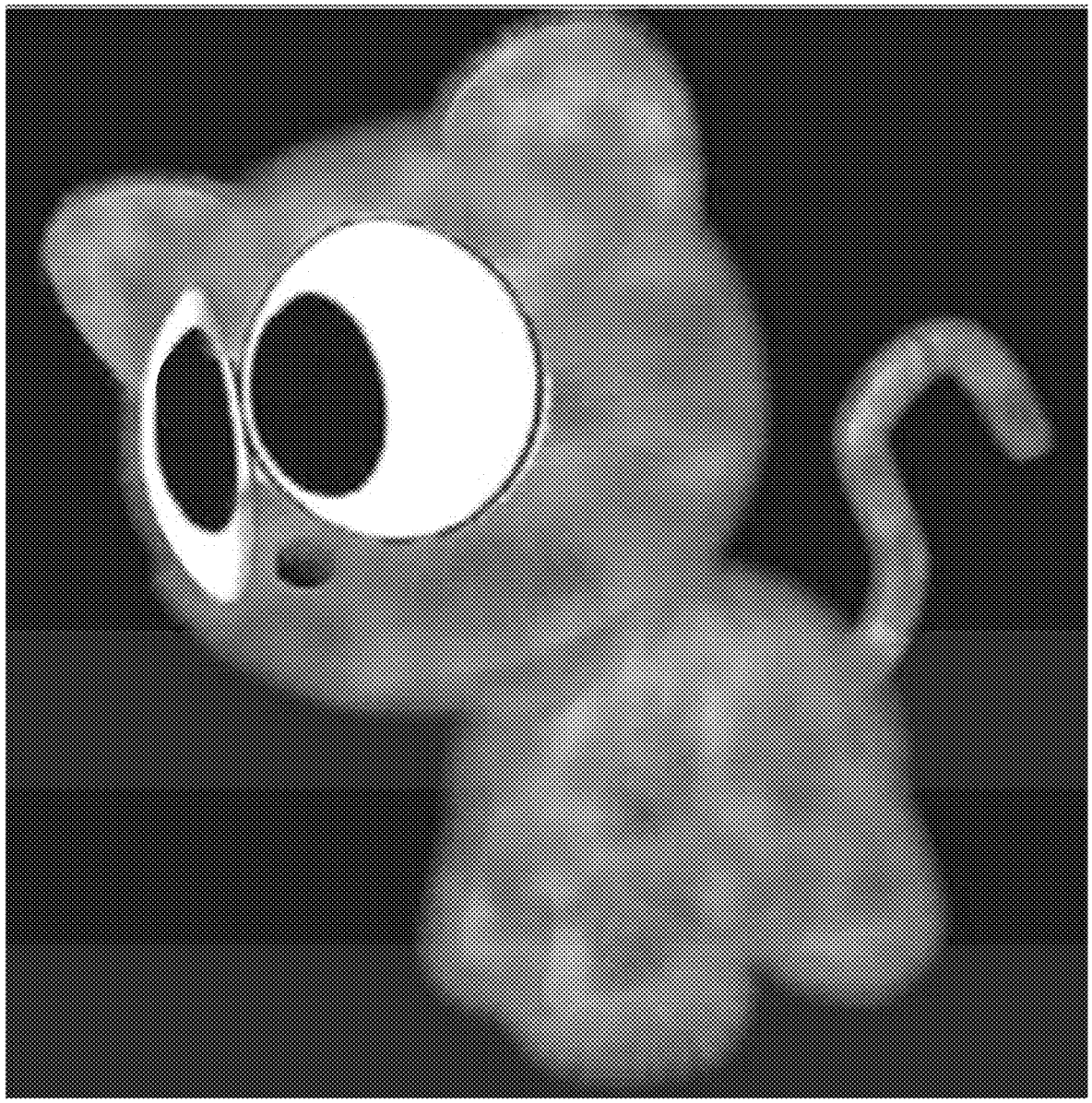
FIG. 5 is a schematic diagram of hair rendering of still another three-dimensional model provided by an implementation of the application.

Please refer to FIGS. 3-5, and assuming that the three-dimensional model to be drawn with the hair is a three-dimensional model of a cat, and the hair distributions of three hair sections are obtained by pre-processing, and the geometric models of these three hair sections are determined, thus the geometric models of these three hair sections can be sequentially superimposed on the outer surface of the three-dimensional model, and during sequentially superimposing the geometric model of each hair section, the geometric model of each hair section are colored by the preset illumination model.

For example, by superimposing a geometric model of a first hair section on the outer surface of the three-dimensional model, and performing illumination processing on the geometric model of the first hair section by the preset illumination model, the hair rendering schematic diagram shown in FIG. 3 can be obtained. Thereafter, a geometric model of a second hair section is superimposed on an outer surface of the first hair section, and the illumination processing is performed on the geometric model of the second hair section by the preset illumination model, and the hair rendering schematic diagram shown in FIG. 4 can be obtained. Thereafter, a geometric model of a third hair section is superimposed on an outer surface of the second hair section, and the illumination processing is performed on the geometric model of the third hair section by the preset illumination model, and the hair rendering schematic diagram shown in FIG. 5 can be obtained.

In a second implementation, the geometric models of the plurality of hair sections are combined sequentially; the rendering interface is called, and the combined geometric models are superimposed on the outer surface of the three-dimensional model by the rendering interface; the first color value of each pixel point in the geometric model of each hair section is determined by the preset illumination model, and the geometric model of each hair section is colored according to the determined first color value, during superimposing the combined geometric models on the outer surface of the three-dimensional model.

That is, in the second implementation, the geometric models of the plurality of hair sections can be combined in sequence from the inside to the outside according to the hair growth direction. Based on the rendering information of organizing all hair sections in an order from the inside to the outside, and then the rendering interface is called to render the combined rendering information. In this way, the geometric information to be rendered can be compressed, the submission number of rendering can be reduced, and the rendering efficiency can be further improved.

In the implementations, the operation of coloring the geometric model of each hair section according to the determined first color value includes the following two implementations.

In a first implementation, the geometric model of each hair section is colored according to the determined first color value.

That is, the hair section can be colored directly according to the color values obtained by the illumination calculation by means of the preset illumination model, so that the drawn hair meets the illumination effect.

In a second implementation, for the first hair section, second color values are determined according to the determined first color value and a preset shadow value, and a geometric model of the first hair section is colored according to the determined second color value; and for a second hair section, third color values are determined according to the determined first color value and a target shadow value, and a geometric model of the first hair section is colored according to the determined third color value.

The first hair section is a first hair section of the plurality of hair sections; and the second hair section is any hair section behind the first hair section. The preset shadow value is a shadow value of the first hair section, and the preset shadow value can be preset by the technician, can be set by the user, or can be set according to the specific three-dimensional model and the three-dimensional scenario, which is not limited in the implementation of the application. The target shadow value is a shadow value of the second hair section, and is less than that of a previous hair section of the second hair section.

In the implementations of the application, by setting the shadow value of the second hair section to be smaller than the shadow value of the previous hair section, that is, decreasing the shadow values of the plurality of hair sections layer by layer, the shadow effect from the hair root to the hair tip can decrease gradually, so that the shadow effect between the hairs can be realistically simulated, and the realism of the hairs is further improved.

Determining the a second color value according to the determined first color value and the preset shadow value means that superimposing the shadow effect on the basis of the determined illumination effect, and determining the color value of the hair after superimposing shadow effect.

In the implementations, for the first hair section, the difference between 1 and the preset shadow value may be calculated, and the difference may be multiplied by the first color value to obtain the second color value. For example, the second color value=the first color value*(1−preset shadow value). For example, if the first color value is 200 and the preset shadow value is 0.2, then the second color value=200*(1−0.2)=160.

For the second hair section, the difference between 1 and the target shadow value can be calculated, and the difference can be multiplied by the first color value to obtain the third color value. For example, the third color value=first color value*(1−target shadow value). For example, if the first color value is 200 and the target shadow value is 0.1, then the third color value=200*(1−0.1)=180.

In addition, during sequentially rendering each hair section by the preset illumination model, after the rendering of one hair section is completed, a rendering result can also be blended with a rendering result of the previous hair section to make the opacity of the plurality of hair sections decrease sequentially.

In the implementations of the application, by acquiring the plurality of initial sections of the cross sections for simulating hair growth, and determining the hair distribution points on each of the plurality of initial sections according to the rule of successively decreasing hair distribution densities, and obtaining the plurality of hair sections, and then sequentially rendering, by means of the preset illumination model, the plurality of hair sections on the three-dimensional model to be drawn with hairs, it is achieved an effect in which the hair distribution maps of the plurality of hair sections are first generated, and then the hair in each hair section is uniformly rendered according to the hair distribution map of each hair section. Compared with the method of rendering each hair separately according to the geometric model of each hair, the rendering method of the application is a simple and efficient, which can improve hair rendering efficiency, and requirements for performance of the rendering device is low.

In addition, by determining the plurality of hair sections according to the rule of successively decreasing hair distribution densities, the hair distribution densities and opacity of the plurality of hair sections can be gradually decreased from the inside to the outside, which can simulate the effect of the densities and opacity of hair gradually decreasing from the hair root to the hair tip and improving the realism of the hair.

Figure 6:
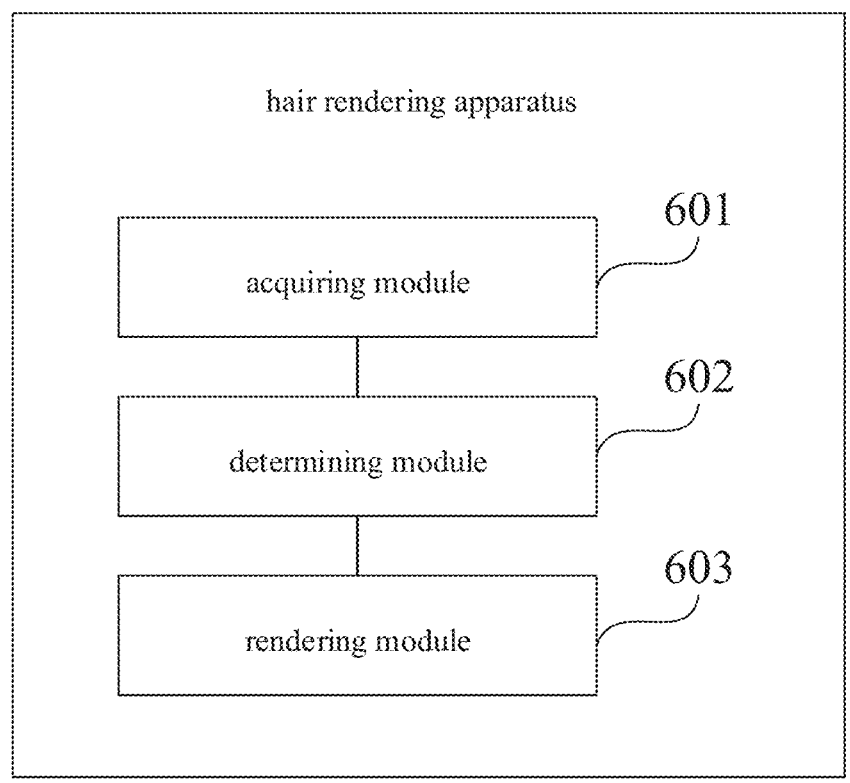
FIG. 6 is a structural block diagram of a hair rendering apparatus provided by an implementation of the application.

FIG. 6 is a structural block diagram of a hair rendering apparatus provided by an implementation of the application. Referring to FIG. 6, the apparatus includes an acquiring module 601, a determining module 602, and a rendering module 603.

The acquiring module 601 is configured to acquire a plurality of initial sections, and the plurality of initial sections are used for simulating cross sections of hair growth;

the determining module 602 is configured to determine hair distribution points on each of the plurality of initial sections according to a rule of successively decreasing hair distribution densities, and obtain a plurality of hair sections; and the rendering module 603 is configured to sequentially render, by means of a preset illumination model, the plurality of hair sections on a three-dimensional model to be drawn with hairs, and obtain a target three-dimensional model, and the preset illumination model is configured to simulate a hair illumination effect.

In some implementations, the determining module 602 includes:

a first sampling unit, configured to sample pixel points in a first initial section according to a first hair distribution density to obtain a plurality of first sampling points, and mark the plurality of first sampling points as hair distribution points to obtain a hair section corresponding to the first initial section, and the first initial section is a first initial section in the plurality of initial sections; and a second sampling unit, configured to sample hair distribution points on a previous hair section of a second initial section according to a second hair distribution density to obtain a plurality of second sampling points, and mark hair distribution points on the second initial section according to the plurality of second sampling points to obtain a hair section corresponding to the second initial section, and the second hair distribution density is less than a hair distribution density of the previous hair section, and the second initial section is any initial section behind the first initial section.

In some implementations, the second sampling unit is configured to:

mark mapping points of the plurality of second sampling points on the second initial section as the hair distribution points; or, perform position shift on the plurality of second sampling points according to a preset shift rule, and mark mapping points of the plurality of shifted second sampling points on the second initial section as the hair distribution points.

In some implementations, the first sampling unit is configured to:

perform Poisson sampling on the pixel points in the first initial section;

the second sampling unit is configured to:

randomly sample the hair distribution points on the previous hair section of the second initial section.

In some implementations, the rendering module 603 includes:

a modeling unit, configured to extend each hair section along a hair growth direction based on hair distribution points on each hair section, and obtain a geometric model of each hair section; and a rendering unit, configured to sequentially render, by means of the preset illumination model, geometric models of the plurality of hair sections on the three-dimensional model.

In some implementations, the rendering unit is configured to:

call a rendering interface, and sequentially superimpose the geometric models of the plurality of hair sections on an outer surface of the three-dimensional model by the rendering interface; and determine a first color value of each pixel point in the geometric model of each hair section by the preset illumination model, and color the geometric model of each hair section according to the determined first color value, during sequentially superimposing the geometric model of each hair section.

In some implementations, the rendering unit is configured to:

sequentially combine the geometric models of the plurality of hair sections;

call the rendering interface, and superimpose the combined geometric models on the outer surface of the three-dimensional model by the rendering interface; and determine the first color value of each pixel point in the geometric model of each hair section by the preset illumination model, and color the geometric model of each hair section according to the determined first color value, during superimposing the combined geometric models on the outer surface of the three-dimensional model.

In some implementations, the rendering unit is configured to:

for a first hair section, determine a second color value according to the determined first color value and a preset shadow value, and color a geometric model of the first hair section according to the determined second color value, and the first hair section is a first hair section of the plurality of hair sections; and for a second hair section, determine a third color value according to the determined first color value and a target shadow value, and color a geometric model of the second hair section according to the determined third color value, and the target shadow value is less than that of a previous hair section of the second hair section, and the second hair section is any hair section behind the first hair section.

In the implementations of the application, by acquiring the plurality of initial sections of the cross sections for simulating hair growth, and determining the hair distribution points on each of the plurality of initial sections according to the rule of successively decreasing hair distribution densities, and obtaining the plurality of hair sections, and then sequentially rendering, by means of the preset illumination model, the plurality of hair sections on the three-dimensional model to be drawn with hairs, it is achieved an effect in which the hair distribution maps of the plurality of hair sections are first generated, and then the hair in each hair section is uniformly rendered according to the hair distribution map of each hair section. Compared with the method of rendering each hair separately according to the geometric model of each hair, the rendering method of the application is a simple and efficient, which can improve hair rendering efficiency, and requirements for performance of the rendering device is low.

Regarding the apparatuses in the foregoing implementations, the specific manner in which each module performs the operation has been described in detail in the implementations of the corresponding methods, and a detailed description will not be given here.

Figure 7:
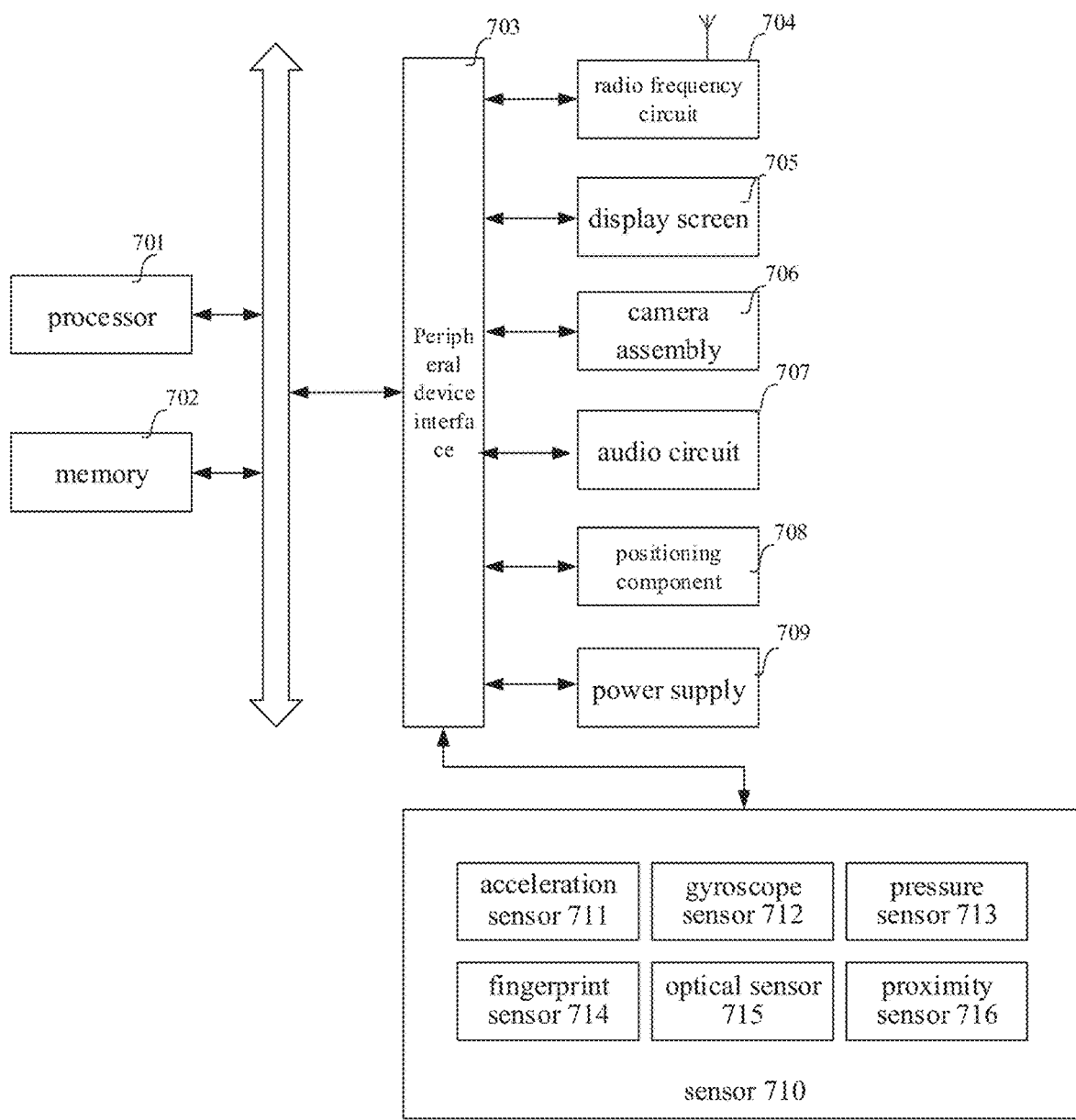
FIG. 7 is a structural block diagram of an electronic device provided by an implementation of the application.

FIG. 7 is a structural block diagram of an electronic device provided by an implementation of the application. The electronic device can be a smart phone, a tablet computer, an MP3 (Moving Picture Experts Group Audio Layer III) Player, an MP4 (Moving Picture Experts Group Audio Layer IV) Player, a laptop or desktop computer, and the like, and also may be a user device, a portable terminal, a laptop terminal, or a desktop terminal.

Generally, the electronic device includes a processor 701 and a memory 702.

The processor 701 may include one or more processing cores, such as a 4-core processor, an 8-core processor, and so on. The processor 701 may be implemented by at least one hardware form among Digital Signal Processing (DSP), Field-Programmable Gate Array (FPGA), and Programmable Logic Array (PLA). The processor 701 may also include a main processor and a coprocessor. The main processor is a processor used to process data in an awake state, also called a Central Processing Unit (CPU); and the coprocessor is a low power consumption processor used to process data in a standby state. In some implementations, the processor 701 may be integrated with a Graphics Processing Unit (GPU), and the GPU is used for rendering and drawing contents that need to be displayed on the display screen. In the implementations of the application, the processor 701 may further include an Artificial Intelligence (AI) processor, and the AI processor is used to process calculation operations related to machine learning.

The memory 702 may include one or more computer-readable storage medium, which may be non-transitory. The memory 702 may also include a high-speed random access memory and a non-volatile memory, such as one or more magnetic disk storage devices and flash memory storage devices. In the implementations of the application, the non-transitory computer-readable storage medium in the memory 702 is used to store at least one instruction, and the at least one instruction is used to be executed by the processor 701 to realize the hair rendering method provided by the method implementations of the application.

In some implementations, the electronic device may further include: a peripheral device interface 703 and at least one peripheral device. The processor 701, the memory 702, and the peripheral device interface 703 may be connected by a bus or a signal line. Each peripheral device can be connected to the peripheral device interface 703 through a bus, a signal line or a circuit board. In some implementations, the peripheral device includes at least one of a radio frequency circuit 704, a display screen 705, a camera 706, an audio circuit 707, a positioning component 708, and a power supply 709.

The peripheral device interface 703 may be used to connect at least one peripheral device related to Input/Output (I/O) to the processor 701 and the memory 702. In some implementations, the processor 701, the memory 702, and the peripheral device interface 703 are integrated on the same chip or circuit board. In some other implementations of the application, any one or two of the processor 701, the memory 702, and the peripheral device interface 703 can be implemented on separate chips or circuit boards, which are not limited in the implementations of the application.

The radio frequency circuit 704 is used for receiving and transmitting Radio Frequency (RF) signals, also called electromagnetic signals. The radio frequency circuit 704 communicates with a communication network and other communication devices through electromagnetic signals. The radio frequency circuit 704 converts electrical signals into electromagnetic signals for transmission, or converts received electromagnetic signals into electrical signals. In some implementations, the radio frequency circuit 704 includes an antenna system, an RF transceiver, one or more amplifiers, a tuner, an oscillator, a digital signal processor, a codec chipset, a user identity module card, and so on. The radio frequency circuit 704 can communicate with other terminals through at least one wireless communication protocol. The wireless communication protocol includes, but is not limited to: metropolitan area networks, various generations of mobile communication networks (2G, 3G, 4G and 5G), wireless local area networks and/or Wireless Fidelity (Wi-Fi) networks. In some implementations, the radio frequency circuit 704 may also include a circuit related to Near Field Communication (NFC), which is not limited in the application.

The display screen 705 is used to display a User Interface (UI). The UI can include graphics, text, icons, videos, and any combination thereof. When the display screen 705 is a touch display screen, the display screen 705 also has the ability to collect touch signals on or above the surface of the display screen 705. The touch signal can be input to the processor 701 as a control signal for processing. At this time, the display screen 705 may also be used to provide virtual buttons and/or virtual keyboards, also called soft buttons and/or soft keyboards. In some implementations, there may be one display screen 705, which is provided as a front panel of the electronic device. In other implementations, there may be at least two display screens 705, which are respectively arranged on different surfaces of the electronic device or in a folding design. In still other implementations, the display screen 705 may be a flexible display screen, which is disposed on the curved surface or the folding surface of the electronic device. Furthermore, the display screen 705 can also be set as a non-rectangular irregular figure, that is, a special-shaped screen. The display screen 705 can be made of materials such as Liquid Crystal Display (LCD), Organic Light-Emitting Diode (OLED), or the like.

The camera assembly 706 is used to capture images or videos. In some implementations, the camera assembly 706 includes a front camera and a rear camera. Generally, the front camera is set on the front panel of the terminal, and the rear camera is set on the back of the terminal. In some implementations, there are at least two rear cameras, each of which is one of a main camera, a depth-of-field camera, a wide-angle camera, and a telephoto camera, so as to implement the fusion of the main camera and the depth-of-field camera to realize background blur function, implement the fusion of the main camera and the wide-angle camera to realize panoramic shooting and Virtual Reality (VR) shooting functions or other fusion shooting functions. In some implementations, the camera assembly 706 may also include a flash. The flash can be a single-color temperature flash or a dual-color temperature flash. Dual color temperature flash refers to a combination of warm light flash and cold light flash, which can be used for light compensation under different color temperatures.

The audio circuit 707 may include a microphone and a speaker. The microphone is used to collect sound waves from the user and the environment, and convert the sound waves into electrical signals and input them to the processor 701 for processing, or input to the radio frequency circuit 704 to implement voice communication. For the purpose of stereo collection or noise reduction, there may be multiple microphones, which are respectively set in different parts of the electronic device. The microphone can also be an array microphone or an omnidirectional collection microphone. The speaker is used to convert the electrical signal from the processor 701 or the radio frequency circuit 704 into sound waves. The speaker can be a traditional membrane speaker or a piezoelectric ceramic speaker. When the speaker is a piezoelectric ceramic speaker, not only can the electrical signal be converted into human audible sound waves, but also the electrical signal can be converted into human inaudible sound waves for purposes such as distance measurement. In some implementations, the audio circuit 707 may also include a headphone jack.

The positioning component 708 is used to locate the current geographic location of the electronic device to implement navigation or Location Based Service (LBS). The positioning component 708 may be a positioning component based on the Global Positioning System (GPS) of the United States, the Beidou system of China, the Grenas system of Russia, or the Galileo system of the European Union.

The power supply 709 is used to supply power to various components in the electronic device. The power source 709 may be alternating current, direct current, disposable batteries, or rechargeable batteries. When the power source 709 includes a rechargeable battery, the rechargeable battery may support wired charging or wireless charging. The rechargeable battery can also be used to support fast charging technology.

In some implementations of the application, the electronic device further includes one or more sensors 710. The one or more sensors 710 include, but are not limited to: an acceleration sensor 711, a gyroscope sensor 712, a pressure sensor 713, a fingerprint sensor 714, an optical sensor 715, and a proximity sensor 716.

The acceleration sensor 711 can detect the magnitude of acceleration on the three coordinate axes of the coordinate system established by the electronic device. For example, the acceleration sensor 711 can be used to detect the components of gravitational acceleration on three coordinate axes. The processor 701 may control the touch screen 705 to display the user interface in a horizontal view or a vertical view according to the gravity acceleration signal collected by the acceleration sensor 711. The acceleration sensor 711 may also be used for the collection of game or user motion data.

The gyroscope sensor 712 can detect the body direction and rotation angle of the electronic device. The gyroscope sensor 712 can cooperate with the acceleration sensor 711 to collect the user's 3D actions on the electronic device. According to the data collected by the gyroscope sensor 712, the processor 701 can implement the following functions: motion sensing (for example, changing the UI according to a user's tilt operation), image stabilization during shooting, game control, and inertial navigation.

The pressure sensor 713 may be arranged on the side frame of the electronic device and/or the lower layer of the touch screen 705. When the pressure sensor 713 is arranged on the side frame of the electronic device, the user's holding signal of the electronic device can be detected, and the processor 701 performs left and right hand recognition or quick operation according to the holding signal collected by the pressure sensor 713. When the pressure sensor 713 is arranged on the lower layer of the touch display screen 705, the processor 701 controls the operability controls on the UI interface according to the user's pressure operation on the touch display screen 705. The operability control includes at least one of a button control, a scroll bar control, an icon control, and a menu control.

The fingerprint sensor 714 is used to collect the user's fingerprint. The processor 701 identifies the user's identity according to the fingerprint collected by the fingerprint sensor 714, or the fingerprint sensor 714 identifies the user's identity according to the collected fingerprint. When it is recognized that the user's identity is a trusted identity, the processor 701 authorizes the user to perform related sensitive operations, including unlocking the screen, viewing encrypted information, downloading software, paying, and changing settings or the like. The fingerprint sensor 714 may be provided on the front, back or side of the electronic device. When a physical button or a manufacturer logo is provided on the electronic device, the fingerprint sensor 714 can be integrated with the physical button or the manufacturer logo.

The optical sensor 715 is used to collect the ambient light intensity. In some implementations of the application, the processor 701 may control the display brightness of the touch screen 705 according to the ambient light intensity collected by the optical sensor 715. In some implementations, when the ambient light intensity is high, the display brightness of the touch screen 705 is increased; when the ambient light intensity is low, the display brightness of the touch screen 705 is decreased. In some implementations of the application, the processor 701 may also dynamically adjust the shooting parameters of the camera assembly 706 according to the ambient light intensity collected by the optical sensor 715.

The proximity sensor 716, also called a distance sensor, is usually provided on the front panel of the electronic device. The proximity sensor 716 is used to collect the distance between the user and the front of the electronic device. In some implementations of the application, when the proximity sensor 716 detects that the distance between the user and the front of the electronic device gradually decreases, the processor 701 controls the touch screen 705 to switch from a bright-screen state to a resting-screen state; when the proximity sensor 716 detects that the distance between the user and the front of the electronic device gradually increases, the processor 701 controls the touch display screen 705 to switch from the resting-screen state to the bright-screen state.

Those skilled in the art can understand that the structure shown in FIG. 7 does not constitute a limitation on the electronic device, and may include more or less components than those shown in the figure, or combine certain components, or adopt different component layouts.

In the implementations of the application, the electronic device includes one or more programs. The one or more programs are stored in the memory and are configured to be executed by one or more processors. The one or more programs include instructions for performing the hair rendering method shown in FIG. 2 provided by the implementations of the application.

In the implementations of the application, there is also provided a non-transitory computer-readable storage medium. The instructions in the storage medium, when executed by a processor of the computer, cause the computer to execute the hair rendering method.

In the implementations of the application, there is also provided a computer program product, which when it runs on a computer, causes the computer to execute the hair rendering method.

Those skilled in the art will easily think of other implementations of the application after considering the specification and practicing the application disclosed herein. This application is intended to cover any variations, uses, or adaptive changes of the application. These variations, uses, or adaptive changes follow the general principles of the application and include common knowledge or conventional technical means in the technical field not disclosed in the application. The description and the implementations are only regarded as example, and the true scope and spirit of the application are pointed out by the following claims.

It should be understood that the application is not limited to the precise structure described above and shown in the drawings, and various modifications and changes can be made without departing from its scope. The scope of the application is only limited by the appended claims.

What is claimed is:

1. A method for hair rendering, comprising:
    acquiring a plurality of initial sections, wherein the plurality of initial sections are used for simulating cross sections of hair growth;
    determining hair distribution points on each of the plurality of initial sections according to a rule of successively decreasing hair distribution densities, and obtaining a plurality of hair sections; and
    sequentially rendering, by means of a preset illumination model, the plurality of hair sections on a three-dimensional model to be drawn with hairs, and obtaining a target three-dimensional model, wherein the preset illumination model is configured to simulate a hair illumination effect,
    wherein said determining hair distribution points on each of the plurality of initial sections according to the rule of successively decreasing hair distribution densities comprises:
    sampling pixel points in a first initial section according to a first hair distribution density to obtain a plurality of first sampling points, and marking the plurality of first sampling points as the hair distribution points to obtain a hair section corresponding to the first initial section, wherein the first initial section is a first initial section in the plurality of initial sections; and
    sampling hair distribution points on a previous hair section of a second initial section according to a second hair distribution density to obtain a plurality of second sampling points, and marking the hair distribution points on the second initial section according to the plurality of second sampling points to obtain a hair section corresponding to the second initial section, wherein the second hair distribution density is less than a hair distribution density of the previous hair section, and the second initial section is any initial section behind the first initial section, wherein said sequentially rendering, by means of the preset illumination model, the plurality of hair sections on the three-dimensional model to be drawn with hairs comprises:

extending each hair section along a hair growth direction based on hair distribution points on each hair section, and obtaining a geometric model of each hair section;

sequentially rendering, by means of the preset illumination model, geometric models of the plurality of hair sections on the three-dimensional model.

2. The method according to claim 1, wherein said marking the hair distribution points on the second initial section according to the plurality of second sampling points comprises:

marking mapping points of the plurality of second sampling points on the second initial section as the hair distribution points; or, performing position shift on the plurality of second sampling points according to a preset shift rule, and marking mapping points of the plurality of shifted second sampling points on the second initial section as the hair distribution points.

3. The method according to claim 1, wherein said sampling pixel points in the first initial section comprises:

performing Poisson sampling on the pixel points in the first initial section;

said sampling hair distribution points on the previous hair section of the second initial section comprises:

randomly sampling the hair distribution points on the previous hair section of the second initial section.

4. The method according to claim 1, wherein said sequentially rendering, by means of the preset illumination model, geometric models of the plurality of hair sections on the three-dimensional model comprises:

calling a rendering interface, and sequentially superimposing the geometric models of the plurality of hair sections on an outer surface of the three-dimensional model through the rendering interface; and determining a first color value of each pixel point in the geometric model of each hair section by the preset illumination model, and coloring the geometric model of each hair section according to the determined first color value, during sequentially superimposing the geometric model of each hair section.

5. The method according to claim 4, wherein said sequentially rendering, by means of the preset illumination model, geometric models of the plurality of hair sections on the three-dimensional model comprises:

sequentially combining the geometric models of the plurality of hair sections;

calling the rendering interface, and superimposing the combined geometric models on the outer surface of the three-dimensional model through the rendering interface; and determining the first color value of each pixel point in the geometric model of each hair section by the preset illumination model, and coloring the geometric model of each hair section according to the determined first color value, during superimposing the combined geometric models on the outer surface of the three-dimensional model.

6. The method according to claim 5, wherein said coloring the geometric model of each hair section according to the determined first color value comprises:

as for a first hair section, determining a second color value according to the determined first color value and a preset shadow value, and coloring a geometric model of the first hair section according to the determined second color value, wherein the first hair section is a first hair section of the plurality of hair sections; and as for a second hair section, determining a third color value according to the determined first color value and a target shadow value, and coloring a geometric model of the second hair section according to the determined third color value, wherein the target shadow value is less than a shadow value of a previous hair section of the second hair section, and the second hair section is any hair section behind the first hair section.

7. The method according to claim 4, wherein said coloring the geometric model of each hair section according to the determined first color value comprises:

as for a first hair section, determining a second color value according to the determined first color value and a preset shadow value, and coloring a geometric model of the first hair section according to the determined second color value, wherein the first hair section is a first hair section of the plurality of hair sections; and as for a second hair section, determining a third color value according to the determined first color value and a target shadow value, and coloring a geometric model of the second hair section according to the determined third color value, wherein the target shadow value is less than a shadow value of a previous hair section of the second hair section, and the second hair section is any hair section behind the first hair section.

8. An electronic device, comprising:

a processor;

a memory for storing instructions executable by the processor, wherein the processor is configured to:

acquire a plurality of initial sections, wherein the plurality of initial sections are used for simulating cross sections of hair growth;

determine hair distribution points on each of the plurality of initial sections according to a rule of successively decreasing hair distribution densities, and obtain a plurality of hair sections; and sequentially render, by means of a preset illumination model, the plurality of hair sections on a three-dimensional model to be drawn with hairs, and obtain a target three-dimensional model, wherein the preset illumination model is configured to simulate a hair illumination effect, wherein determining the hair distribution points on each of the plurality of initial sections according to the rule of successively decreasing hair distribution densities comprises:

sampling pixel points in a first initial section according to a first hair distribution density to obtain a plurality of first sampling points, and mark the plurality of first sampling points as hair distribution points to obtain a hair section corresponding to the first initial section, wherein the first initial section is a first initial section in the plurality of initial sections; and sampling hair distribution points on a previous hair section of a second initial section according to a second hair distribution density to obtain a plurality of second sampling points, and mark hair distribution points on the second initial section according to the plurality of second sampling points to obtain a hair section corresponding to the second initial section, wherein the second hair distribution density is less than a hair distribution density of the previous hair section, and the second initial section is any initial section behind the first initial section, wherein said sequentially rendering, by means of the preset illumination model, the plurality of hair sections on the three-dimensional model to be drawn with hairs comprises:

extending each hair section along a hair growth direction based on hair distribution points on each hair section, and obtain a geometric model of each hair section;

sequentially rendering, by means of the preset illumination model, geometric models of the plurality of hair sections on the three-dimensional model.

9. The electronic device according to claim 8, wherein said marking the hair distribution points on the second initial section according to the plurality of second sampling points comprises:

marking mapping points of the plurality of second sampling points on the second initial section as the hair distribution points; or, performing position shift on the plurality of second sampling points according to a preset shift rule, and mark mapping points of the plurality of shifted second sampling points on the second initial section as the hair distribution points.

10. The electronic device according to claim 8, wherein said sampling pixel points in the first initial section comprises:

performing Poisson sampling on the pixel points in the first initial section;

said sampling hair distribution points on the previous hair section of the second initial section comprises:

randomly sampling the hair distribution points on the previous hair section of the second initial section.

11. The electronic device according to claim 8, wherein said sequentially rendering, by means of the preset illumination model, geometric models of the plurality of hair sections on the three-dimensional model comprises:

calling a rendering interface, and sequentially superimpose the geometric models of the plurality of hair sections on an outer surface of the three-dimensional model through the rendering interface; and determining a first color value of each pixel point in the geometric model of each hair section by the preset illumination model, and color the geometric model of each hair section according to the determined first color value, during sequentially superimposing the geometric model of each hair section.

12. The electronic device according to claim 11, wherein said sequentially rendering, by means of the preset illumination model, geometric models of the plurality of hair sections on the three-dimensional model comprises:

sequentially combining the geometric models of the plurality of hair sections;

calling the rendering interface, and superimpose the combined geometric models on the outer surface of the three-dimensional model through the rendering interface; and determining the first color value of each pixel point in the geometric model of each hair section by the preset illumination model, and color the geometric model of each hair section according to the determined first color value, during superimposing the combined geometric models on the outer surface of the three-dimensional model.

13. The electronic device according to claim 12, wherein coloring the geometric model of each hair section according to the determined first color value comprises:

as for a first hair section, determining a second color value according to the determined first color value and a preset shadow value, and coloring a geometric model of the first hair section according to the determined second color value, wherein the first hair section is a first hair section of the plurality of hair sections; and as for a second hair section, determining a third color value according to the determined first color value and a target shadow value, and coloring a geometric model of the second hair section according to the determined third color value, wherein the target shadow value is less than a shadow value of a previous hair section of the second hair section, and the second hair section is any hair section behind the first hair section.

14. The electronic device according to claim 11, wherein coloring the geometric model of each hair section according to the determined first color value comprises:

as for a first hair section, determining a second color value according to the determined first color value and a preset shadow value, and coloring a geometric model of the first hair section according to the determined second color value, wherein the first hair section is a first hair section of the plurality of hair sections; and as for a second hair section, determining a third color value according to the determined first color value and a target shadow value, and coloring a geometric model of the second hair section according to the determined third color value, wherein the target shadow value is less than a shadow value of a previous hair section of the second hair section, and the second hair section is any hair section behind the first hair section.

15. A non-transitory computer-readable storage medium, wherein instructions in the storage medium, when executed by a processor of a computer, cause the computer to execute a method for hair rendering, wherein the method comprises:

acquiring a plurality of initial sections, wherein the plurality of initial sections are used for simulating cross sections of hair growth;

determining hair distribution points on each of the plurality of initial sections according to a rule of successively decreasing hair distribution densities, and obtaining a plurality of hair sections; and sequentially rendering, by means of a preset illumination model, the plurality of hair sections on a three-dimensional model to be drawn with hairs, and obtaining a target three-dimensional model, wherein the preset illumination model is configured to simulate a hair illumination effect, wherein said determining hair distribution points on each of the plurality of initial sections according to the rule of successively decreasing hair distribution densities comprises:

sampling pixel points in a first initial section according to a first hair distribution density to obtain a plurality of first sampling points, and marking the plurality of first sampling points as the hair distribution points to obtain a hair section corresponding to the first initial section, wherein the first initial section is a first initial section in the plurality of initial sections; and sampling hair distribution points on a previous hair section of a second initial section according to a second hair distribution density to obtain a plurality of second sampling points, and marking the hair distribution points on the second initial section according to the plurality of second sampling points to obtain a hair section corresponding to the second initial section, wherein the second hair distribution density is less than a hair distribution density of the previous hair section, and the second initial section is any initial section behind the first initial section, wherein said sequentially rendering, by means of the preset illumination model, the plurality of hair sections on the three-dimensional model to be drawn with hairs comprises:

extending each hair section along a hair growth direction based on hair distribution points on each hair section, and obtaining a geometric model of each hair section;

sequentially rendering, by means of the preset illumination model, geometric models of the plurality of hair sections on the three-dimensional model.

* * * * *